United States Patent Office 3,168,548
Patented Feb. 2, 1965

3,168,548
PROCESS FOR PREPARATION OF 1-HYDROXY-METHYL - 4 - PHOSPHA-3,5,8-TRIOXABICYCLO-[2.2.2]OCTANE-4-SULFIDE
Rudi F. W. Rätz, Hamden, Conn., assignor to Olin Mathieson Chemical Corporation, New Haven, Conn., a corporation of Virginia
No Drawing. Filed June 26, 1962, Ser. No. 205,205
3 Claims. (Cl. 260—461)

This invention relates to a novel bicyclic alcohol having a phosphorus atom therein, and more specifically it relates to a phosphorus-containing bicyclic primary alcohol having the following structure:

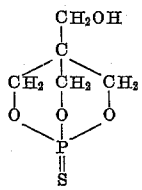

The correct chemical name for the above compound in accordance with Chemical Abstracts usage is 1-hydroxymethyl - 4 - phospha - 3,5,8-trioxabicyclo[2.2.2]octane-4 sulfide.

A copending application, S.N. 175,270, filed on Feb. 23, 1962, disclosed an improved process for the preparation of 3,9-dichloro-2,4,8,10-tetraoxa-3,9-diphosphaspiro[5.5]undecane-3,9-dioxide. This compound was prepared by the reaction of pentaerythritol with a molar excess of phosphoryl chloride.

It had been assumed that pentaerythritol would react in the same manner with thiophosphoryl chloride to obtain 3,9-dichloro-2,4,8,10-tetraoxa - 3,9 - diphosphaspiro [5.5]undecane-3,9-disulfide. However the reaction of these components proceeded in an entirely different and unexpected manner, and it became apparent that a compound having a primary alcohol functional group had been obtained instead of the dichloro derivative.

Therefore one of the objects of this invention was to prepare and identify this reaction product of pentaerythritol and thiophosphoryl chloride.

Another object of this invention was to isolate this alcoholic reaction product in good yield.

Still another object was to prepare an alcohol which would react with alkylene oxides to yield a new series of surface active compounds.

These objects have been accomplished in acordance with the present invention. It has been found that pentaerythritol reacts with thiophosphoryl chloride to produce the above illustrated bicyclic primary alcohol in good yield. Elemental and infra-red analysis indicated that the alcohol had been obtained in a high degree of purity. Furthermore an efficient process for the preparation of the bicyclic structure is also disclosed herein.

The desired reaction proceeds readily by mixing the two components together and heating at an appropriate temperature. No solvents or diluents need be employed during the reaction period.

The following example will serve to illustrate the preparation of the alcohol described herein. It is to be noted that this example is only illustrative and is not to be construed as limiting the scope of this inventon as modifications pertaining to the preparation would be obvious to one skilled in the art.

Example 1

Into a 500 ml. round bottom flask was placed 99.0 g. (0.73 mole) of pentaerythritol and 123.5 g. (0.73 mole) of thiophosphoryl chloride. The flask was equipped with a reflux condenser which was connected to a drying tube filled with calcium chloride. The reaction mixture was heated by means of an oil bath to 160° C. and kept at this temperature for five hours. At this point no further hydrogen chloride was being evolved, and heating was terminated after one additional hour at 170° C. The mixture was allowed to cool to room temperature, and the slightly tan reaction product formed a cake which was first broken into lumps and then crushed into small pieces. The material was freed from some adhering sticky by-product after one washing with 150 ml. of cold ether. There was then obtained 143 g. of a free-flowing powder. This crude material was extracted with 750 ml. of boiling water from which the product crystallized in colorless small needles, M.P. 156°–158° C. During this extraction some material remained undissolved and collected as a heavy oil at the bottom of the flask. The aqueous solution was separated from this oil by decantation through a folded filter. After one recrystallization from xylene, the purified product was isolated as shining long needles having a melting point of 160.5° C. The following analysis indicated that the purified bicyclic alcohol had been obtained in 63% yield (89.5 g.).

*Analysis.*—Calcd. for $C_5H_9O_4PS$: C, 30.59; H, 4.62; P, 15.82; S, 16.35. Found: C, 30.70; H, 5.10; P, 15.70; S, 16.32.

The presence of a primary alcohol functional group was also well established by infra-red analysis which showed a powerful absorption in the expected region.

While the desired bicyclic alcohol can be prepared at a reaction temperature range of from about 100° to 200° C., it has been determined that the preferred temperature range is about 130° to 170° C. At this temperature range, the reaction proceeds rapidly and hydrogen chloride is removed from the reaction system. When no further evolution of hydrogen chloride is observed during the reaction period, cooling can be applied to the reaction mixture preparatory to isolating the solid alcohol.

Several acid acceptors have been employed during the reaction period in an effort to improve the yield of primary alcohol. For example, triethylamine and pyridine have been utilized as such hydrogen chloride binding agents. However the use of these components has not resulted in any significant process improvement.

It has been found that, based on the amount of pentaerythritol used, the thiophosphoryl chloride should preferably be utilized in approximately equimolar amounts. Although satisfactory yields of bicyclic alcohol can be obtained in the presence of a 10% molar excess of the chloride, the yields of alcohol are adversely affected in the presence of much larger molar excesses. This is attributed to the reactivity of the formed bicyclic alcohol with the excess thiophosphoryl chloride.

The bicyclic alcohol of this invention has been found to be useful as an intermediate in the preparation of a novel series of surfactants. These surfactants can be prepared very easily as a result of the reactivity of the alcohol with alkylene oxides. For example a series of water-soluble non-ionic compounds are prepared by reaction of ethylene oxide, while other less water-soluble and lower-foaming compounds can be prepared by reaction with a higher oxide such as butylene oxide.

Esters of the alcohol also have been found to have utility as lubricity improvers in oils. A particularly suitable ester for this application is the stearyl ester which can be readily prepared by the reaction of stearyl chloride with the alcohol.

What is claimed is:

1. A process for the preparation of 1-hydroxymethyl-4-phospha-3,5,8-trioxabicyclo[2.2.2]octane - 4 - sulfide which comprises reacting pentaerythritol with thiophosphoryl chloride at a temperature in the range of 100° to 200° C.

2. The process of claim 1 wherein a temperature in the range of 130° to 170° C. is employed.

3. A process for the preparation of 1-hydroxymethyl-4-phospha-3,5,8-trioxabicyclo[2.2.2]octane-4-sulfide which comprises reacting pentaerythritol with a substantially equivalent amount of thiophosphoryl chloride at a temperature in the range of 100° to 200° C., cooling the reaction mixture, and isolating the solid alcohol.

References Cited by the Examiner
UNITED STATES PATENTS

| 2,643,261 | 6/53 | Matuszak et al. | 260—461.304 |
| 3,038,001 | 6/62 | Wadsworth et al. | 260—461.104 |

CHARLES B. PARKER, *Primary Examiner.*

MORRIS LIEBMAN, *Examiner.*

UNITED STATES PATENT OFFICE

CERTIFICATE OF CORRECTION

Patent No. 3,168,548

February 2, 1965

Rudi F. W. Rätz

It is hereby certified that error appears in the above numbered patent requiring correction and that the said Letters Patent should read as corrected below.

Column 2, line 60, for "of ethylene" read -- with ethylene --.

Signed and sealed this 15th day of June 1965.

(SEAL)
Attest:

ERNEST W. SWIDER
Attesting Officer

EDWARD J. BRENNER
Commissioner of Patents